US012747577B2

(12) United States Patent
Brekke

(10) Patent No.: US 12,747,577 B2
(45) Date of Patent: Sep. 29, 2026

(54) CONSTRUCTION CONNECTOR HAVING FASTENER RECEIVER

(71) Applicant: Columbia Insurance Company, Omaha, NE (US)

(72) Inventor: Steve Brekke, Lakeville, MN (US)

(73) Assignee: Columbia Insurance Company, Omaha, NE (US)

(*) Notice: Subject to any disclaimer, the term of this patent is extended or adjusted under 35 U.S.C. 154(b) by 588 days.

(21) Appl. No.: 17/816,620

(22) Filed: Aug. 1, 2022

(65) Prior Publication Data

US 2023/0031903 A1 Feb. 2, 2023

Related U.S. Application Data

(60) Provisional application No. 63/228,349, filed on Aug. 2, 2021.

(51) Int. Cl.
*F16B 15/00* (2006.01)
*E04B 1/26* (2006.01)

(52) U.S. Cl.
CPC ........ *E04B 1/2612* (2013.01); *F16B 15/0053* (2013.01)

(58) Field of Classification Search
CPC . E04B 1/2612; F16B 15/0046; F16B 15/0053
See application file for complete search history.

(56) References Cited

U.S. PATENT DOCUMENTS

| | | | | |
|---|---|---|---|---|
| 1,015,402 A * | 1/1912 | Romünder | .......... | F16B 15/0046 403/DIG. 15 |
| 1,844,823 A * | 2/1932 | Rosenberg | .......... | F16B 25/0078 411/425 |
| 2,334,406 A | 11/1943 | Gray | | |
| 3,031,727 A * | 5/1962 | Neshitt | ..................... | E04B 1/49 403/219 |

(Continued)

FOREIGN PATENT DOCUMENTS

| | | | | |
|---|---|---|---|---|
| GB | 144853 A * | 6/1920 | ............... | B65D 9/32 |
| GB | 723676 | 2/1955 | | |
| WO | WO-2020146900 A1 * | 7/2020 | ............. | E04B 1/003 |

OTHER PUBLICATIONS

International Search Report and Written Opinion, dated Nov. 2, 2022, 7 pages.

(Continued)

*Primary Examiner* — Brian E Glessner
(74) *Attorney, Agent, or Firm* — Stinson LLP

(57) ABSTRACT

A construction connector that connects to a support member with a fastener has a connection element that engages the support member and a fastener receiver connected to the connection element. The fastener receiver includes a raised element and a driving element. The raised element has a proximal end portion connected to the connection element and a distal end portion disposed distally of the proximal end portion. The driving element is coupled to the distal end portion of the raised element and projects generally proximally from the distal end portion of the raised element. The (Continued)

driving element includes a cylindrical wall defining a fastener opening sized and shaped to receive the fastener. The driving element is constructed to be driven into the support member as the fastener is driven into the support member.

26 Claims, 13 Drawing Sheets

(56) References Cited

U.S. PATENT DOCUMENTS 3,141,532 A * 7/1964 Runyan ................. E04D 3/3606 29/432
3,211,043 A * 10/1965 Sanford .............. F16B 15/0046 411/921
3,304,106 A * 2/1967 Mccormack ........ F16B 15/0046 411/451.3
3,449,997 A 6/1969 Couch
3,638,892 A * 2/1972 Boye ......................... F16L 3/08 411/440
3,667,337 A * 6/1972 Burke ................. F16B 15/0046 411/467
3,703,304 A * 11/1972 Losee ................. F16B 15/0046 52/712
4,198,175 A * 4/1980 Knepp ................ F16B 15/0046 52/289
4,361,997 A * 12/1982 DeCaro ................... F16B 43/00 411/533
4,395,174 A 7/1983 Freeman
4,630,984 A * 12/1986 Reinwall ................. F16B 35/04 411/533
4,726,164 A * 2/1988 Reinwall ............... E04D 3/3603 411/533
4,974,298 A * 12/1990 Thallon .............. A47G 27/0462 160/404
5,071,280 A * 12/1991 Turner .................... F16B 9/058 403/283
5,110,247 A * 5/1992 Losada ................... F16B 19/14 227/124
5,217,339 A 6/1993 O'Connor et al.
5,284,311 A * 2/1994 Baer .................... A47B 57/402 403/381
5,529,451 A * 6/1996 Bruins .................... E04D 5/145 411/441
5,564,248 A * 10/1996 Callies .................... F16B 9/052 52/715
5,788,444 A * 8/1998 Losada ................... F16B 19/14 411/441
5,908,278 A 6/1999 Hasan et al.
5,915,903 A 6/1999 Osterle et al.
5,934,855 A 8/1999 Osterle et al.
5,992,122 A 11/1999 Rohrmoser et al.
6,145,272 A 11/2000 Tomaini
6,183,182 B1 * 2/2001 Baumgartner ........ E04D 3/3603 411/533
6,345,925 B1 2/2002 Coleman
6,665,991 B2 12/2003 Hasan
6,722,095 B2 4/2004 Kobetsky
7,797,811 B2 * 9/2010 Bosacco ................. F16B 15/00 29/525.01
8,166,720 B2 * 5/2012 Garrigus ................. F16B 43/00 52/410
8,672,600 B2 * 3/2014 Reznar .................... E04F 15/04 52/489.1
9,551,371 B2 * 1/2017 Koch .................... F16B 37/048
9,689,417 B2 * 6/2017 Stewart ................. F16B 31/028
11,098,478 B2 * 8/2021 Downs .................. E04B 1/2608
11,510,713 B2 * 11/2022 Niver ................. A61B 17/8047
11,608,628 B2 * 3/2023 Allen ...................... E04B 1/388
2002/0094253 A1 7/2002 Enomoto et al.
2004/0096269 A1 * 5/2004 Shahnazarian ....... E04B 1/2612 403/230
2008/0199275 A1 8/2008 Brown et al.
2009/0049676 A1 * 2/2009 Bosacco ................. F16B 15/00 29/525.01
2010/0326006 A1 12/2010 Yaros
2011/0243683 A1 10/2011 Howe et al.
2011/0272556 A1 11/2011 Lin
2012/0222382 A1 * 9/2012 Brekke ................. E04B 1/2612 52/702
2017/0009444 A1 * 1/2017 Downs .................. E04B 1/2612
2018/0045236 A1 * 2/2018 Saje ...................... F16B 19/086
2019/0292783 A1 9/2019 Pryor et al.
2019/0352898 A1 11/2019 Lin et al.
2021/0381227 A1 * 12/2021 Downs .................. E04B 1/2612

OTHER PUBLICATIONS

Simpson Strong-Tie Company Inc., Simpson Strong-Tie Wood Construction Connectors, CSHP, High-Performance Coiled Strap brochure, p. 266, updated Jun. 1, 2019, US, 1 page.
European Patent Office, Extended European Search Report, EP Application No. 22853781.7, May 16, 2025, 8 pages.

* cited by examiner

CONSTRUCTION CONNECTOR HAVING FASTENER RECEIVER

CROSS-REFERENCE TO RELATED APPLICATION

This application claims priority to U.S. Provisional Application No. 63/228,349, filed Aug. 2, 2021, the entirety of which is hereby incorporated by reference.

FIELD

The present disclosure generally relates to connections between a component and a support member, and more specifically, to fastener-based connections between a construction connector, or other device, and a wooden support member.

BACKGROUND

In the construction industry, fasteners are used to join construction connectors, such as joist hangers, to supporter members, such as beams and joists. Each fastener, such as a screw or a nail, is inserted into an opening (e.g., a punched nail hole) in the construction connector and driven into the support member to connect the construction connector to the support member, as generally shown in FIG. 3. Some types of conventional fasteners, as shown in FIGS. 1 and 2, may include larger diameter shoulders or shafts adjacent the head of the fasteners to provide a larger diameter bearing surface or to provide a surface on which connecting members can rotate.

SUMMARY

In one aspect, a construction connector to be connected to a support member with a fastener driven proximally into the support member along an insertion axis comprises a connection element and a fastener receiver. The connection element has an interface surface arranged to engage the support member when the construction connector is connected to the support member with the fastener. The fastener receiver is connected to the connection element. The fastener receiver includes a raised element and a driving element. The raised element has a proximal end portion connected to the connection element and a distal end portion disposed distally of the proximal end portion. The driving element is coupled to the distal end portion of the raised element and projects generally proximally from the distal end portion of the raised element. The driving element includes a cylindrical wall defining a fastener opening sized and shaped to receive the fastener and to extend along the fastener. The driving element is configured to be driven into and displace material of the support member as the fastener is driven into the support member.

In another aspect, a method of making a construction connector comprises forming a connection element of the construction connector out of a material and forming a fastener receiver out of a portion of the material of the connection element. The fastener receiver has a raised element and a driving element. The raised element has a proximal end portion connected to the connection element and a distal end portion disposed distally of the proximal end portion. The driving element is coupled to the distal end portion of the raised element and extends generally proximally from the distal end portion of the raised element. The driving element includes a cylindrical wall defining a fastener opening sized and shaped to receive a fastener and to extend along the fastener. The driving element is configured to be driven into and displace material of the support member as the fastener is driven into the support member.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
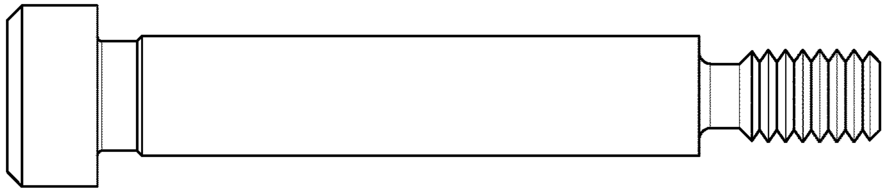
FIG. 1 (PRIOR ART)
FIG. 1 is a side elevation of one example of a conventional fastener.
Figure 2:
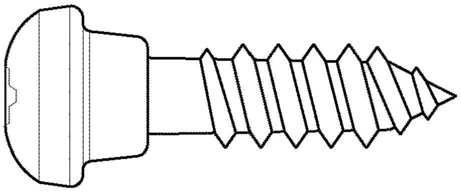
FIG. 2 (PRIOR ART)
FIG. 2 is a side elevation of another example of a conventional fastener.
Figure 3:
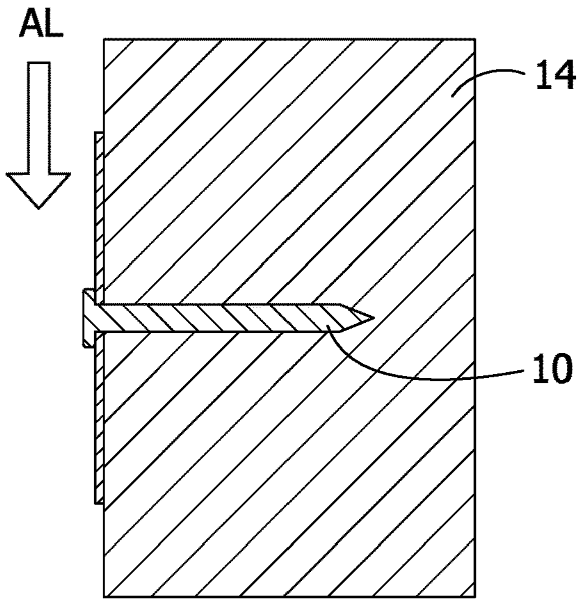
FIG. 3 (PRIOR ART)
FIG. 3 is a schematic section of a nail attaching a conventional construction connector to a support member.
Figure 4:
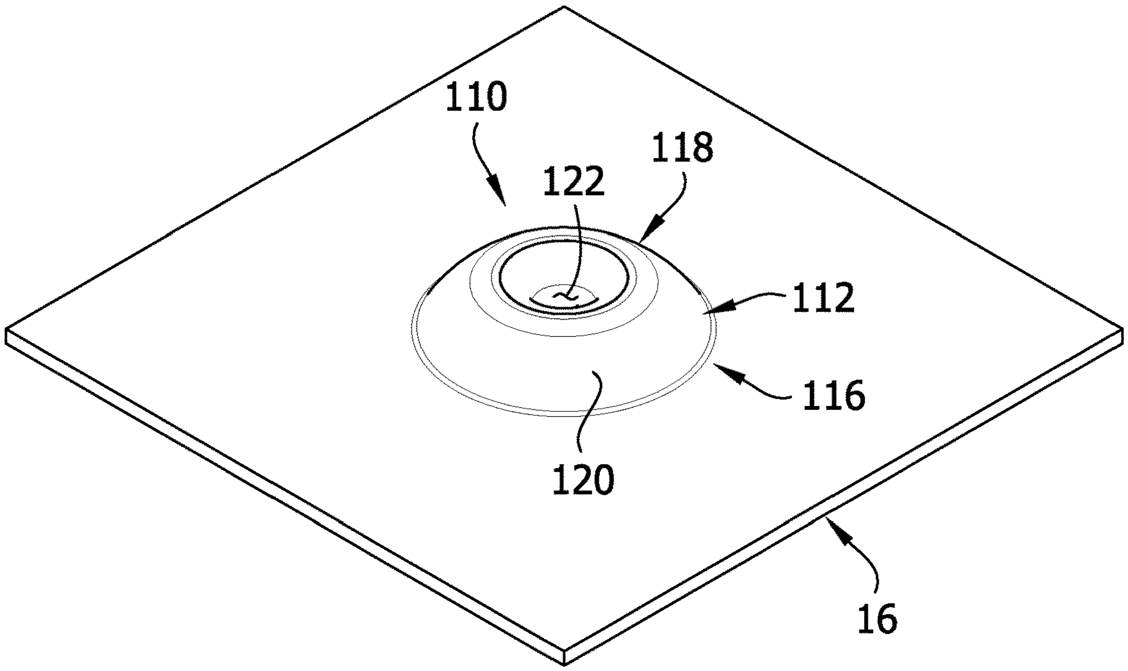
FIG. 4 is a top perspective of a construction connector segment having a fastener receiver constructed according to one embodiment of the present disclosure.
Figure 5:
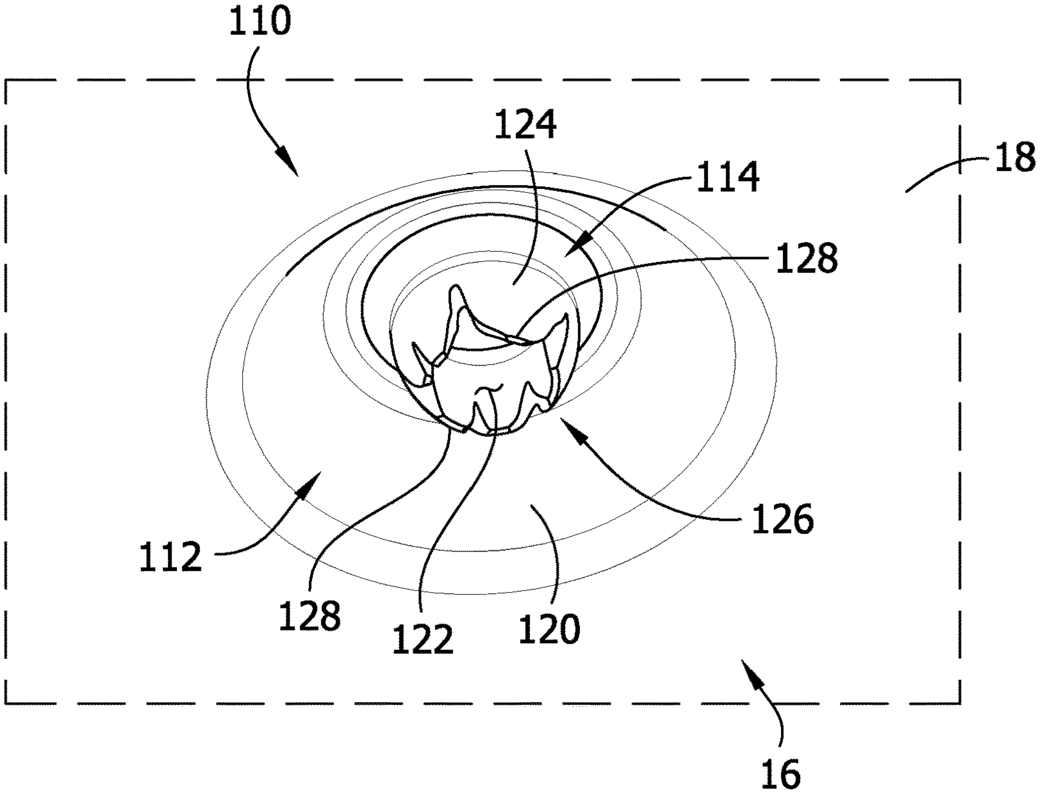
FIG. 5 is an enlarged, fragmentary bottom perspective thereof.
Figure 6:
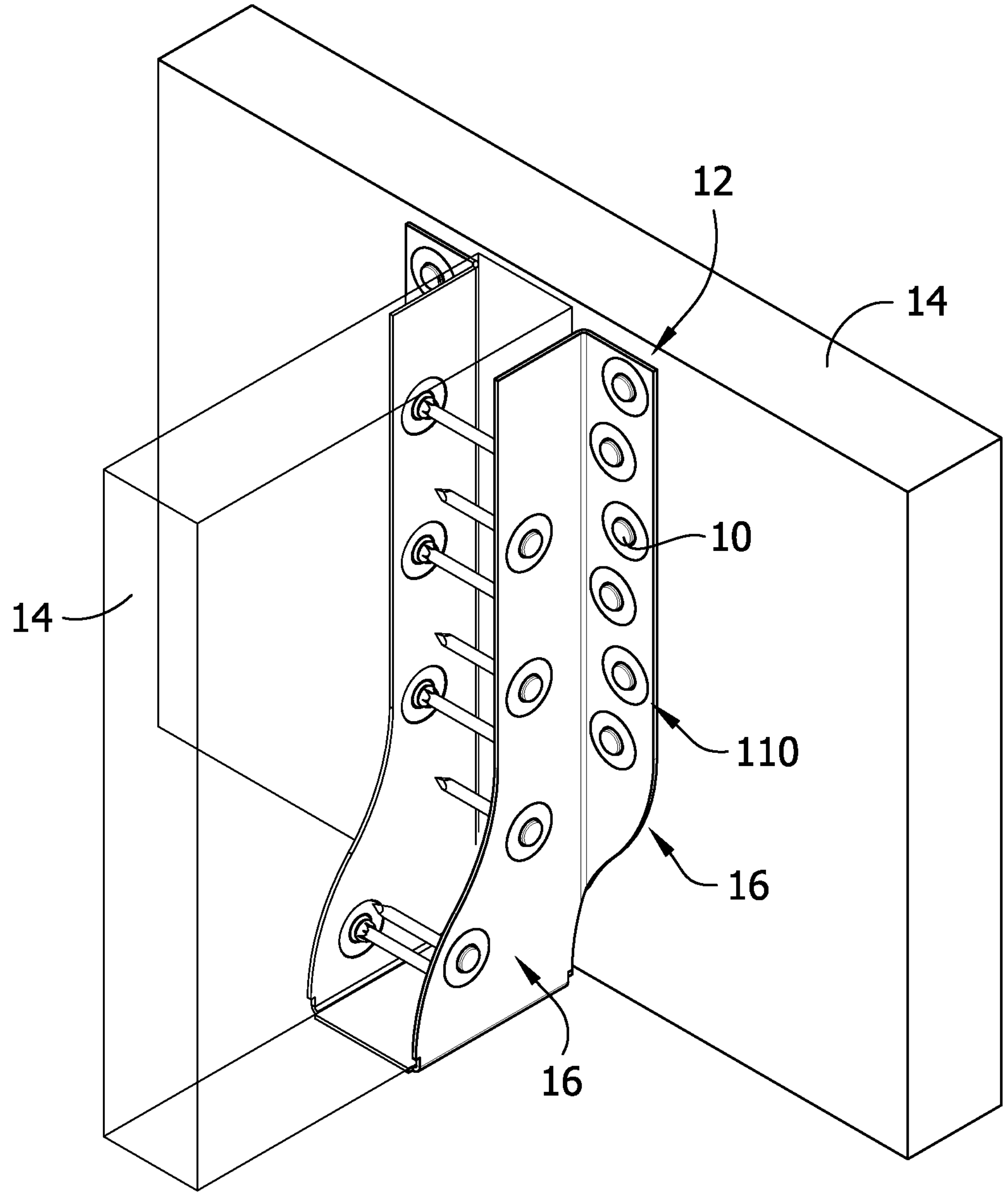
FIG. 6 is a perspective of a construction connector including the fastener receiver attached to a support member.
Figure 7:
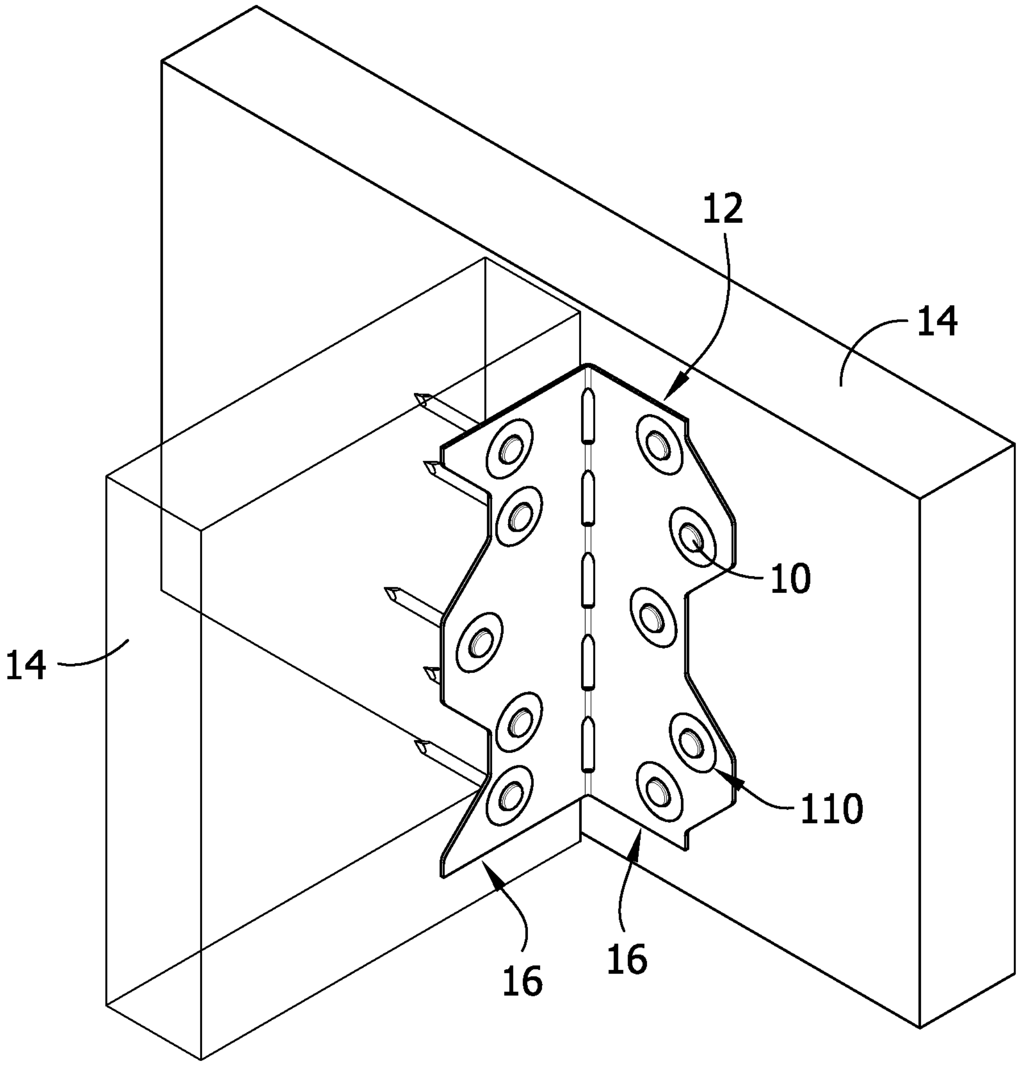
FIG. 7 is a perspective of a construction connector of another version of the present disclosure attached to a support member.
Figure 8:
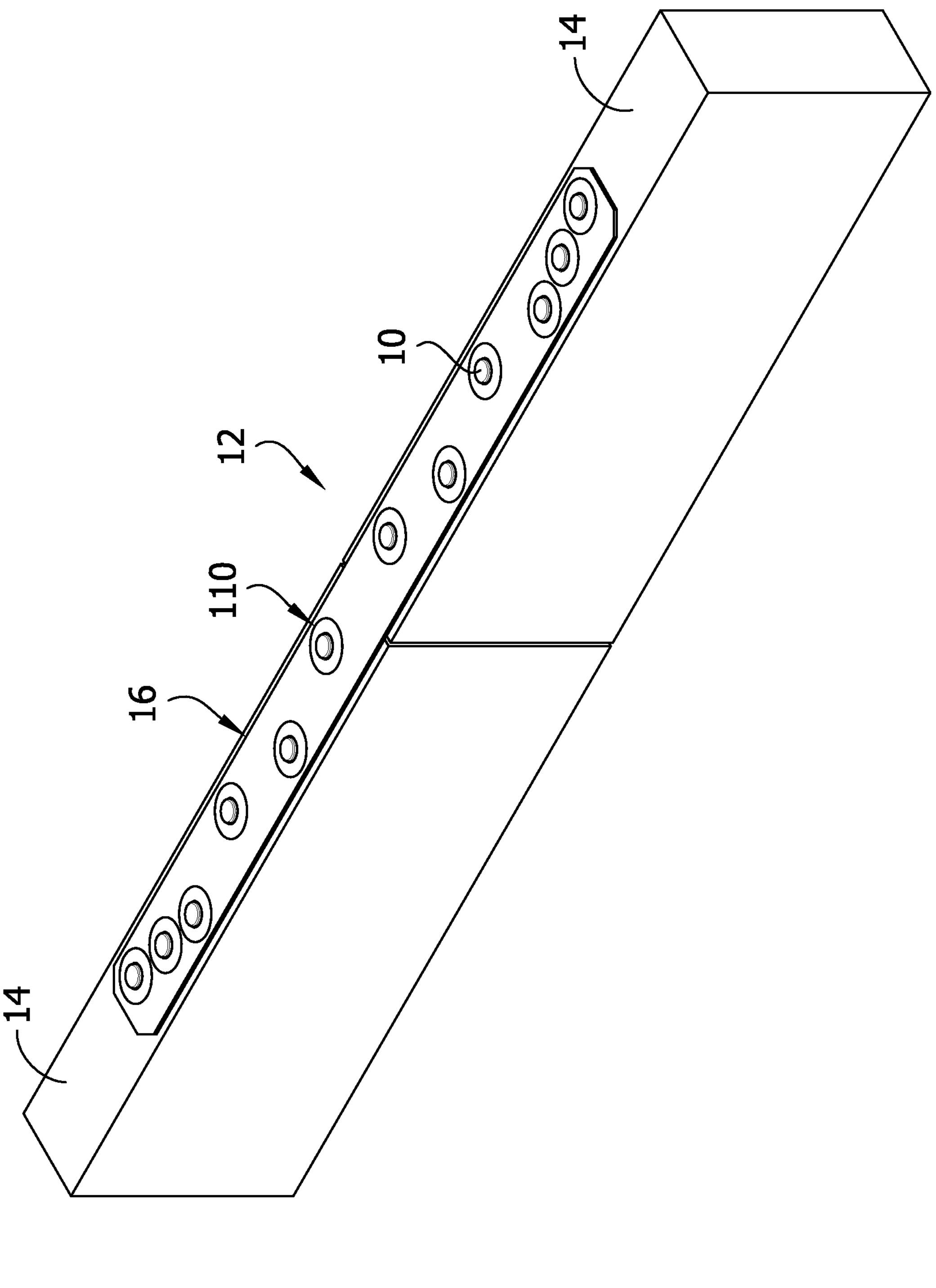
FIG. 8 is a perspective of a construction connector according to yet another version of the present disclosure attached to a support member.
Figure 10:
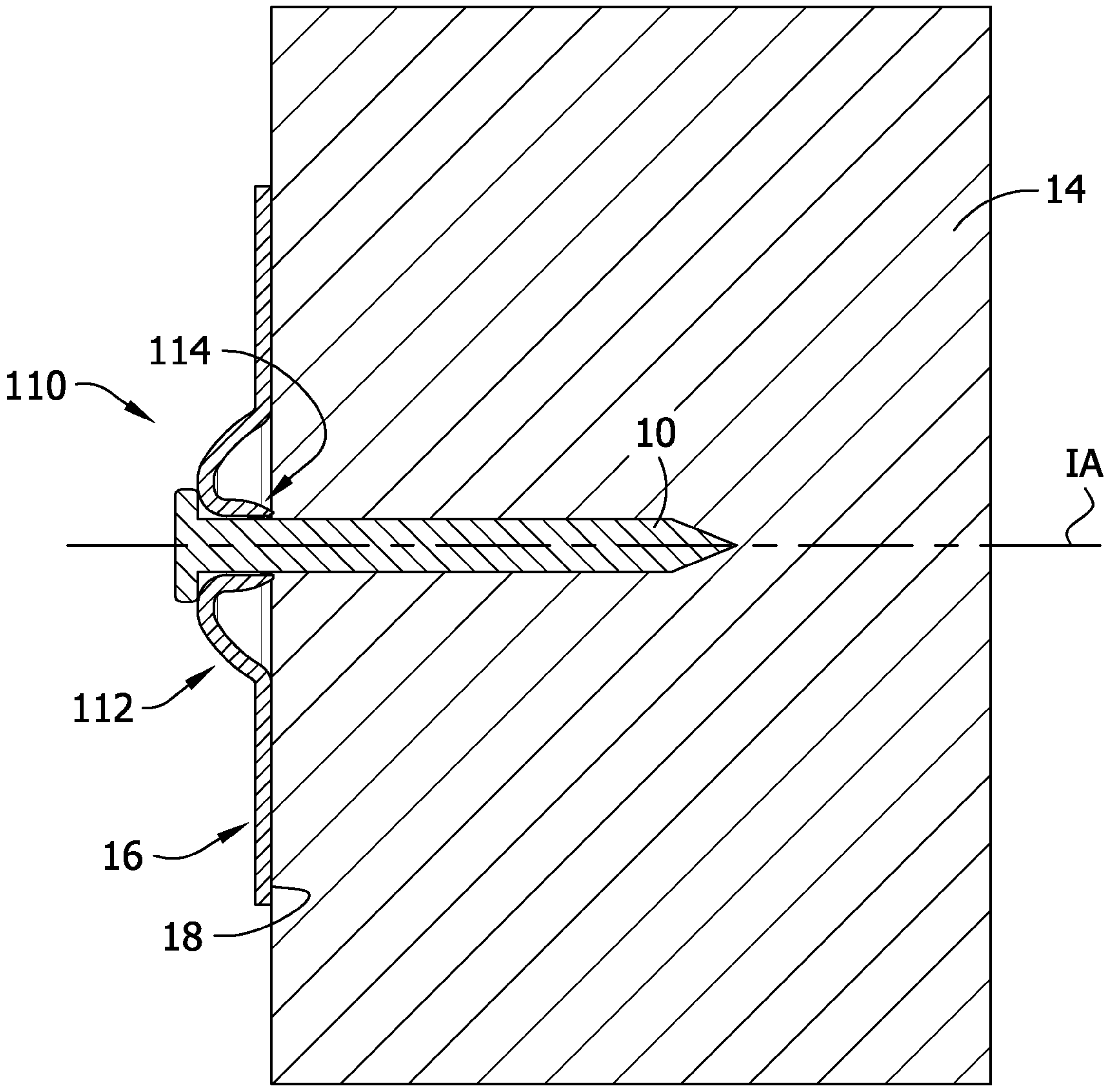
FIG. 10 is a vertical section of FIG. 9.

Referring to FIGS. 4-8, a construction fastener segment including a fastener receiver 110 according to one embodiment of the present disclosure is generally indicated at reference numeral 16. The construction fastener segment 16 is a generic representation used herein to show the fastener receiver 110 in general and without association with a specific construction connector. The fastener receiver 110 is configured to receive a fastener 10 (e.g., a dowel fastener), such as a screw or nail, to connect the construction connector (broadly, a device) to a structural or support member 14 (e.g., a joist, a beam, a column, a floor, etc.). Preferably, the support member is made of wood or other wood-replacement construction material that can conform to a fastener when the fastener is driven into the support member for holding the fastener within the support member. The fastener receiver 110 can be part of generally any device that is connected to the support member 14 with a fastener 10. For example, the fastener receiver 110 can be part of a construction connector 12. The fastener receiver 110 can be used with generally any type of construction connector 12, such as a joist hanger as illustrated in FIG. 6, an angled bracket as illustrated in FIG. 7, or a strap as illustrated in FIG. 8. Generally, construction connectors 12 connect two or more support members 14 (e.g., a joist and a header) together. The support members 14 will typically be made of wood or a similar material. Typically, a construction connector 12 is connected to a support member 14 with one or more fasteners 10 driven proximally into the support member along an insertion axis IA (FIG. 10). For the purposes of the description, the direction in which the fastener 10 is installed or driven into a support member is the driving or proximal direction, with the opposite direction being the distal direction. A radial direction is outward with respect to the insertion axis IA. The insertion axis is generally parallel to the proximal and distal directions.

The construction connector 12 can include one or more fastener receivers 110, each for receiving one of the fasteners 10. The fastener receivers 110 of the construction connector 12 are generally identical. The construction connector 12 includes one or more connection elements 16. Each connection element 16 is configured to be secured to one or more support members 14. Each connection element 16 may support one or more fastener receivers 110. The connection element 16 has an interface surface 18 arranged to engage a support member 14 when the construction connector 12 is connected to the support member with one or more fasteners 10. In the illustrated examples, the connection element 16 is generally a plate or flange have a generally planar interface surface 18. The connection element 16 may be formed in any suitable manner, such as by deformation of sheet metal as part of the process for forming a one-piece construction fastener 12. Other configurations of the connection element and interface surface are within the scope of the present disclosure. For example, the interface surface could be curved. It is understood the fastener receivers described herein can be incorporated in other devices, besides construction connectors.

Referring to FIGS. 4 and 5, the fastener receiver 110 includes a raised element 112 and a driving element 114. The fastener receiver 110 is connected to the connection element 16. The raised element 112 has a proximal end portion 116 connected to the connection element 16 and a distal end portion 118 disposed distally of the proximal end portion. The connection element 16 extends radially outward from its connection to the raised element 112. The planar surface 18 of the connection element 16 is configured for flatwise engagement with the support member 14. The proximal end portion 116 of the raised element 112 is generally adjacent to or at the interface surface 18 of the connection element 16. The raised element 112 generally extends distally from the proximal end portion 116 (e.g., away from the interface surface 18 of the connection element) to the distal end portion 118. In this embodiment, the raised element 112 includes a side wall 120 extending from the proximal end portion 116 to the distal end portion 118. The side wall 120 is generally annular. In the illustrated embodiment, the raised element 112 has a dome shape. Specifically, the side wall 120 of the raised element 112 has a dome shape. The side wall 120 generally forms a portion of a dome, with the side wall tapering or curving inward (e.g., radially inward) as the side wall extends distally from the proximal end portion 116.

The driving element 114 is coupled to the distal end portion 118 of the raised element 112. The driving element 114 projects generally proximally from the distal end portion 118 of the raised element 112, generally toward the interface surface 18 (e.g., an interface surface plane defined thereby) of the connection element 16 to which the fastener receiver 110 is connected. The driving element 114 defines a fastener opening 122 sized and shaped to receive a fastener 10. The driving element 114 includes a generally cylindrical wall 124 defining the fastener opening 122. The fastener opening 122 is elongate and extends generally parallel to the insertion axis IA. The cylindrical wall 124 has a length extending along the insertion axis IA. The cylindrical wall 124 is circumferentially continuous along at least a portion of the length of the wall. The circumferentially continuous portion of the cylindrical wall 124 ensures the cylindrical wall will completely encircle the fastener 10 (e.g., a shaft thereof) and extend along a length of the fastener shaft a distance greater than the thickness of the material to effectively transfer the applied load AL to the support member 14. In the illustrated embodiment, the cylindrical wall 124 is preferably circumferentially continuous adjacent the distal end portion 118 of the raised element 112. Moreover, the cylindrical wall 124 extends along the shaft of the fastener 10 a distance greater than twice the thickness of the sheet metal material forming the connection element 16 and fastener receiver 110. A free end 126 of the driving element 114 (e.g., cylindrical wall 124) is, preferably, co-planar with the interface surface 18 (e.g., coextensive with the interface surface plane) or is disposed distally of the interface surface plane of the interface surface (e.g., spaced toward the distal end portion 118 of the raised element 112 from the interface surface). This makes it easier to attach the connection element 16 to the support member 14, by allowing the interface surface 18 of the connection element to engage (e.g., lay flat against) the support member 14 before the fastener 10 is driven into the support member. However, it will be understood that the free end 126 could be located proximally of the interface surface plane of the interface surface 18. As illustrated, the driving element 114 may include one or more tips 128 at the free end 126 of the cylindrical wall 124. The tips 128 are generally pointed, making it easier to drive the driving element 114 into the support member 14. More particularly, the tips 128 of the free end 126 are capable of displacing material of the support member 14 (e.g., displacing the wood) as the fastener 10 is driven in to the support member.

In one embodiment, the fastener receiver 110 is formed as one piece or integrally formed with the connection element 16 of the construction connector 12. In one embodiment, the construction connector 12 is stamped from a piece of sheet metal (broadly, a blank), although other suitable materials and methods of manufacture are within the scope of the present disclosure. For example, making the construction connector 12 can include forming the connection element 16 out of a material and then forming the fastener receiver 110 out of a portion of the material of the connection element.

When the construction connector 12 is formed by stamping, a die can be used on a portion of the material of the connection element 16 to form the raised element 112. In addition, the fastener opening 122 and driving element 114 can be formed by piercing the portion of the material of the connection element 16, without removing any material. In other words, in one method, no portion of the material is separated from the rest or remainder of the material to form the fastener opening 122, unlike the methods used to form conventional openings (e.g., punched holes). Piercing the material may also cause the portion of the material to crack and split, thereby forming the one or more tips 128 of the driving element 114. By making the construction connector 12 in this manner, each fastener receiver 110 of the construction connector is generally formed out of material that otherwise would have been discarded when making a conventional construction connector (e.g., a connector with punched holes that receive fasteners). Thus, there is no increase in material costs when making construction connectors 12 with fastener receivers 110. However, other ways of forming the construction connector 12 and the one or more fastener receivers 110 thereon are within the scope of the present disclosure. For example, in one embodiment the fastener receivers can be formed separate from the rest of the construction connector and then attached, such as by welding, to the connection element.

Referring to FIGS. 9-12, the fastener receiver 110 is configured to be driven into the support member 14 and thereby displace material of the support member in the manner in which a nail or nailing tooth. Specifically, the driving element 114 of the fastener receiver 110 is configured to be driven into the support member 14 as the fastener 10 is driven into the support member. To permit the driving element 114 to be driven into the support member 14, the raised element 112 is configured to be deformed as the fastener 10 is driven into the support member. In particular, the distal end portion 118 of the raised element is configured to be driven toward the support member 14 as the fastener 10 is driven into the support member. To deform the raised element 112 as the fastener 10 is driven into the support member 14, the distal end portion 118 of the raised element is arranged to be engaged by a head of the fastener. The distal end portion 118 has a dimension (e.g., width, diameter) that is less than a corresponding dimension of the head of the fastener 10 to ensure the head of the fastener contacts the distal end portion. The raised element 112 of the fastener receiver 110 is configured such that it can be deformed by generally the same amount of force used to drive the fastener 10 into the support member 14. For example, in the illustrated embodiment, the raised element 112 is formed out of sheet metal which can be bent or deflected by the force applied by a tool wielded by the user to drive the fastener 10 into the support member 14.

Figure 9:
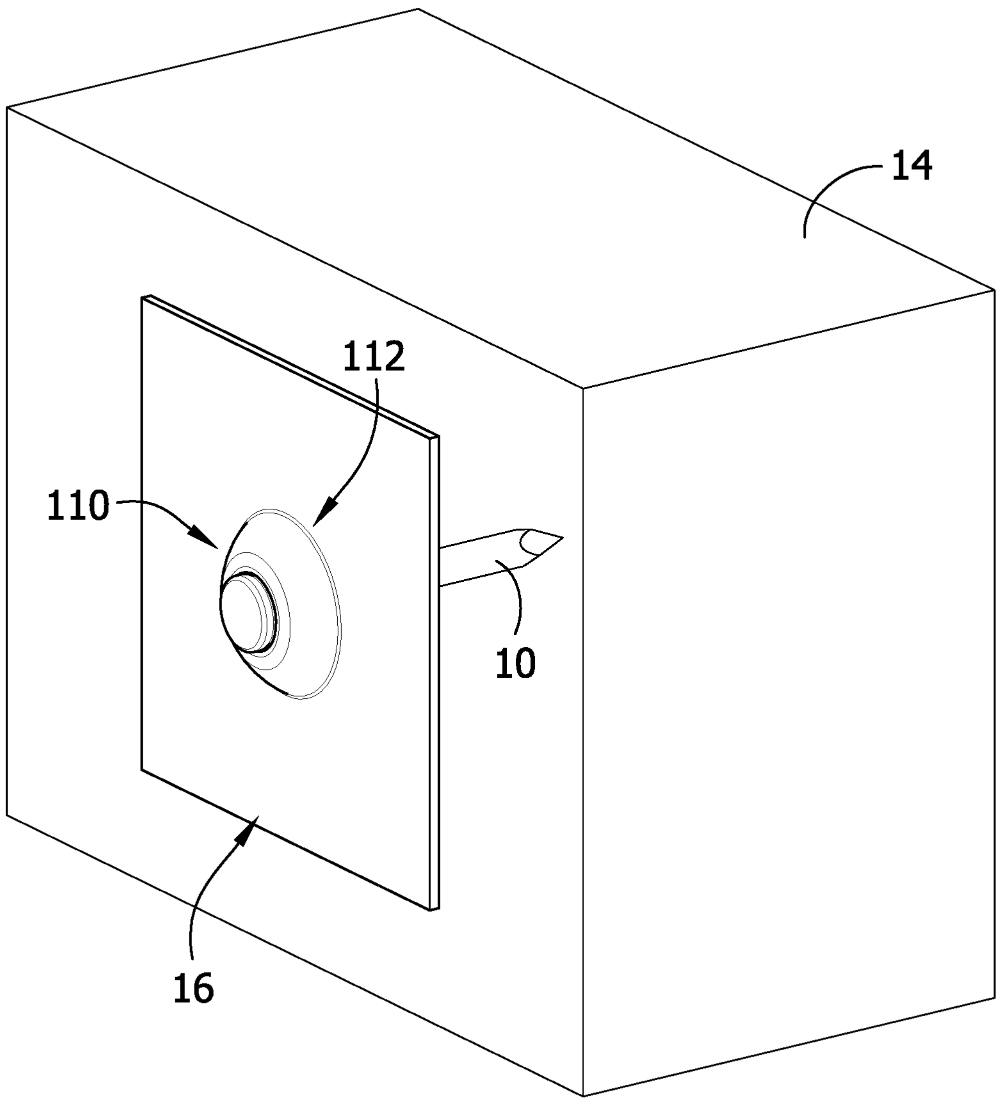
FIG. 9 is a perspective schematically illustrating a fastener attaching the construction connector element of FIG. 4 to a support member, before the fastener has driven the fastener receiver into the support member.
Figure 11A:
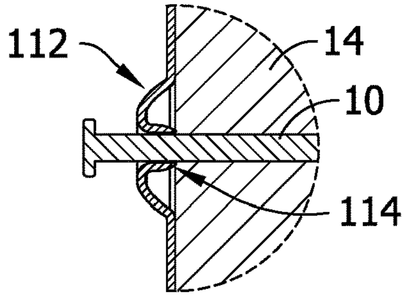
FIGS. 11A-F illustrate the steps of attaching the construction connector element of FIG. 4 to the support member with the fastener.
Figure 11B:
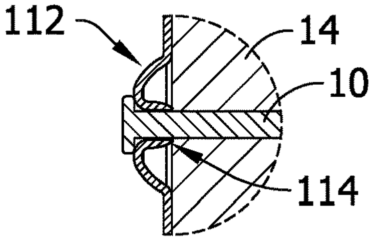
Figure 11C:
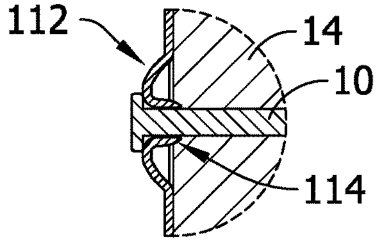
Figure 11D:
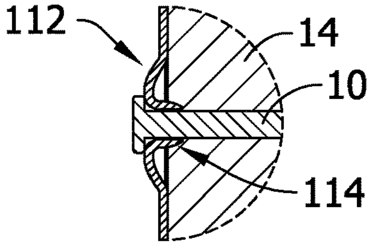
Figure 11E:
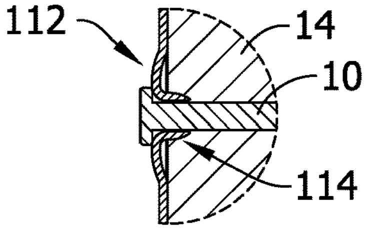
Figure 11F:
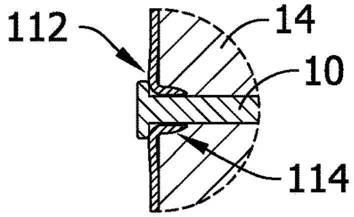
Figure 12:
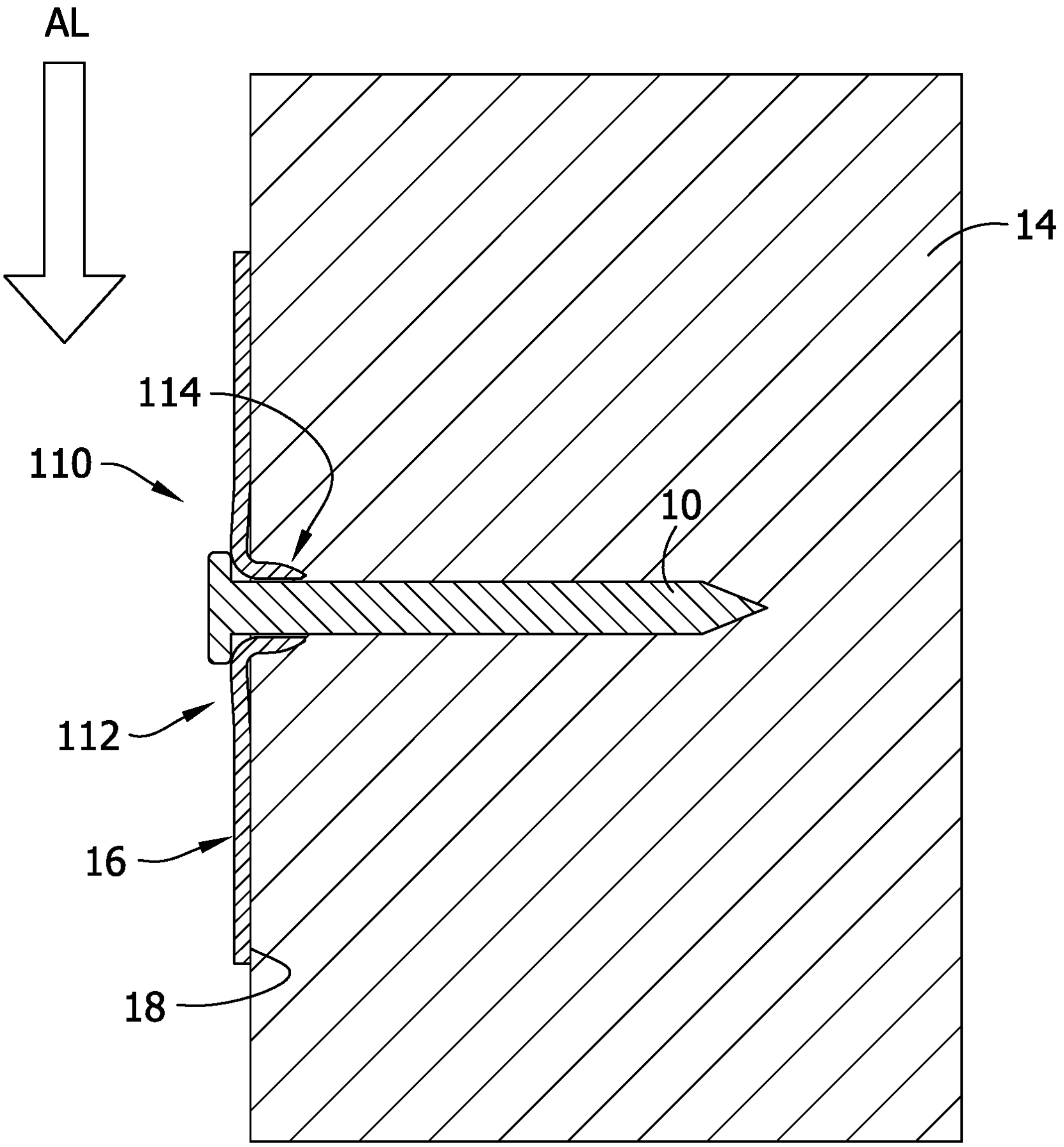
FIG. 12 is a schematic section illustrating attachment of the construction connector element of FIG. 4 to the support member after the fastener has driven the fastener receiver into the support member.

In operation, to attach the connection element 16 of the construction connector 12 to the support member 14, a fastener 10 is inserted into the fastener opening 122 of the fastener receiver 110 and driven into the support member, as shown in FIG. 11A. If the fastener 10 is a nail, a hammer (e.g. a manual or pneumatic hammer) may be used to drive the nail into the support member 14. If the fastener 10 is a screw, a screw driver (e.g., manual or powered screw driver) may be used to drive the nail into the support member 14. As the fastener 10 is driven into the support member 14, the head of the fastener contacts the distal end portion 118 of the raised element 112 (broadly, the fastener contacts the fastener receiver 110). The contact between the head of the fastener 10 and the distal end portion 118 of the raised element 112 is shown in FIGS. 9, 10, and 11B. Once the head of the fastener 10 engages the distal end portion 118 of the raised element 112, further driving of the fastener, via the tool being used by the user, deforms the raised element and drives the driving element 114 into the support member 14 with the rest of the fastener, as shown in FIGS. 11C-F. In particular, the head of the fastener 10 generally flattens the raised element 112 as the fastener is driven into the support member, thereby driving the driving element 114 into the support member. The fastener 10 continues to flatten the raised element 112 and drive the driving element 114 into the support member 14 until the side wall 120 generally lies flat against the support member, as shown in FIGS. 11F and 12. In this position, the proximal and distal end portions 116, 118 of the raised element 112 are generally disposed at the same position along the insertion axis IA.

Figure 13B:
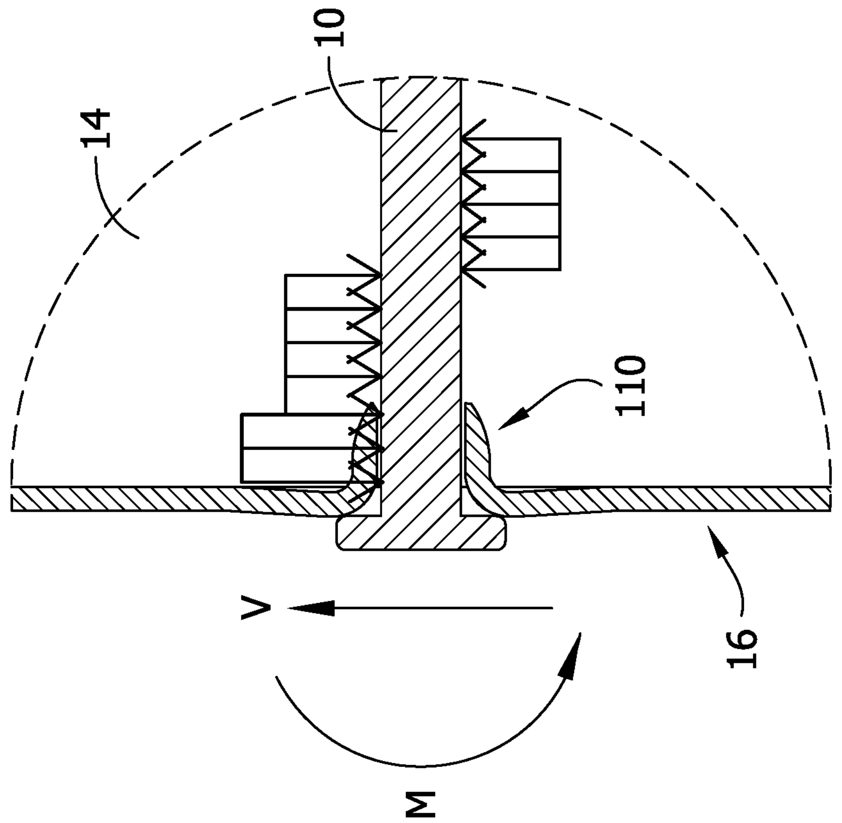
FIGS. 13A-B are load diagrams of a conventional connection (FIG. 13A) and a connection using the construction connector with fastener receiver of FIG. 4 (FIG. 13B)
Figure 13A:
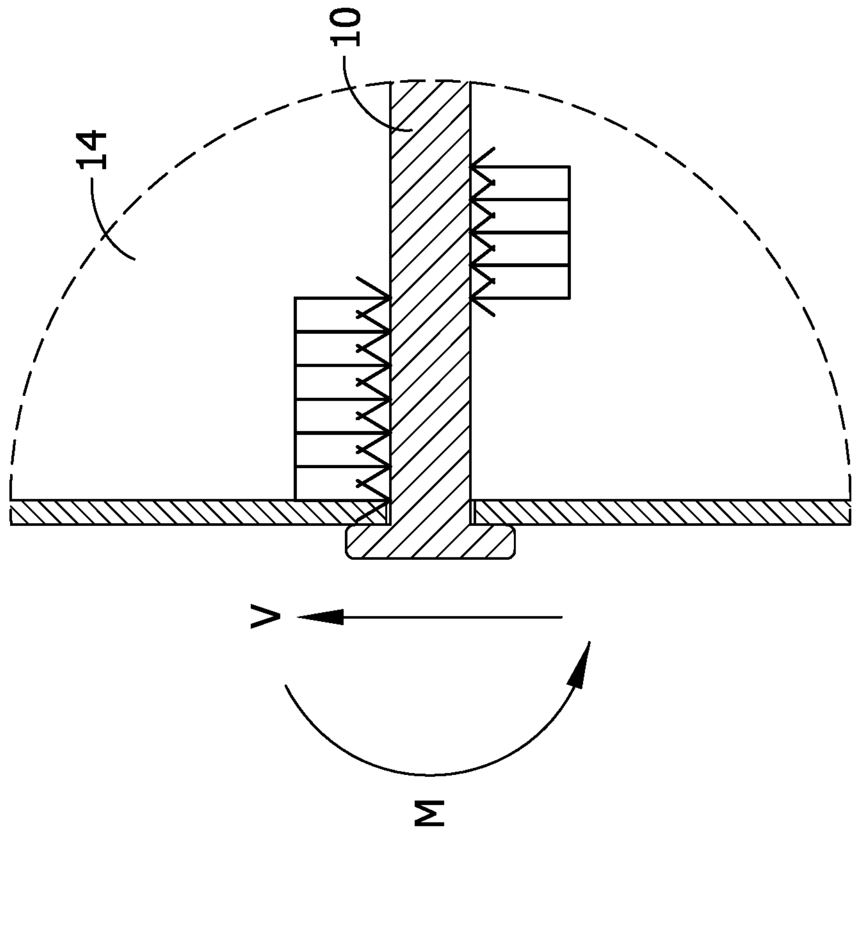

By driving the driving element 114 of the fastener receiver 110 into the support member 10, the overall load carrying capacity of the connection between the construction connector 12 and the support member is significantly increased over conventional connections. Specifically, the larger bearing surface provided by driving element 114, and in particular the bearing surface provided by the cylindrical wall 124, (as compared to the bearing surface provided by the shaft of the fastener 10) against the support member 14 increases the load capacity of the connection between the construction connector 12 and the support member. A general representation of the increased load carrying capacity of a connection using the fastener receiver 110 over a conventional connection (e.g., a punched hole) is shown in FIGS. 13A-B. FIG. 13A illustrates the conventional connection and FIG. 13B illustrates the connection using the fastener receiver 110 of the present disclosure. When a load AL is applied to the connection through the connection element 16 in a direction perpendicular to a shank of the fastener 10, a shear force V and a moment force M are applied to the fastener 10. These forces must be resisted by the support member 14. As illustrated in FIGS. 13A-B, the larger bearing surface provided by the driving element 114 provides a larger resistance then the corresponding portion of shaft of the fastener 10 alone. As a result, the overall load carrying capacity of the connection is increased. For example, the allowable load the connection between the construction connector 12 and the support member 10 can support may increase by as much as 25% or more when using the fastener receivers 110 as compared to conventional connections using the same amount of fasteners. Alternatively, connections using the fastener receivers 110 can use 20% fewer fasteners 10 compared to conventional connections while maintaining the same allowable load for the connection. Preferably, the fastener opening 122 is sized and shaped to closely conform to the size and shape of the fastener 10 inserted therein so that the cylindrical wall 124 engages the fastener to facilitate the load transfer between the fastener 10 and driving element 114.

Figure 14:
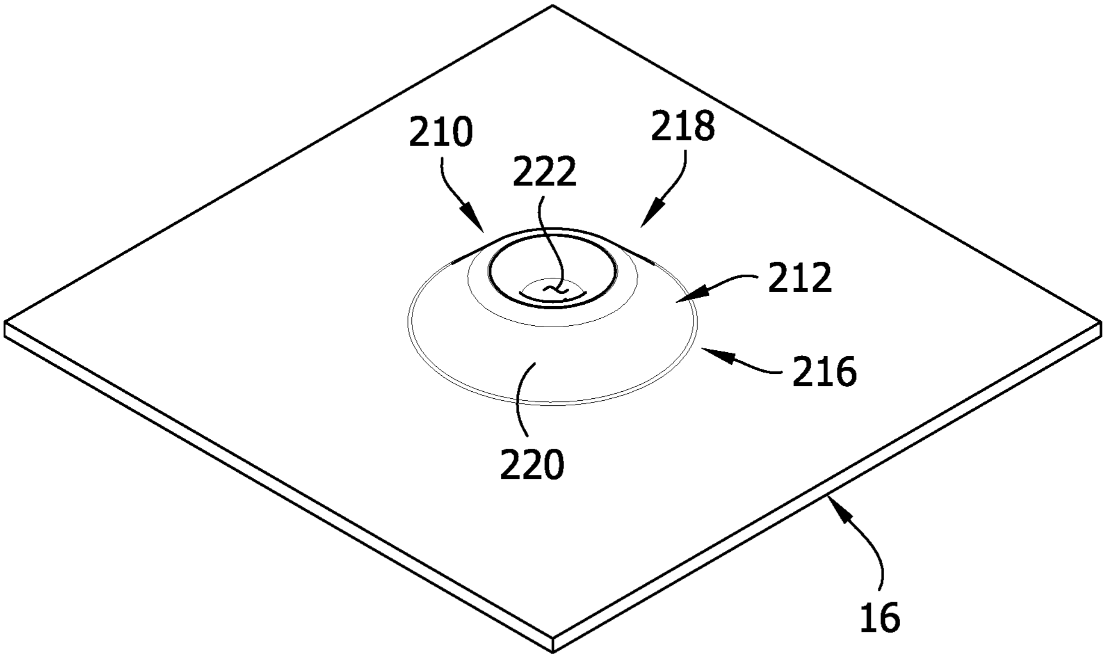
FIG. 14 is a perspective of a fastener receiver of a construction connector element according to another embodiment of the present disclosure.

Referring to FIG. 14, another embodiment of a fastener receiver according to the present disclosure is generally indicated at reference numeral 210. The fastener receiver 210 of FIG. 14 is generally analogous to the fastener receiver 110 of FIGS. 4-13 and, thus, for ease of comprehension, where similar, analogous or identical parts are used, reference numerals "100" units higher are employed. Accordingly, unless clearly stated or indicated otherwise, the above descriptions regarding the fastener receiver 110 of FIGS. 4-13 also apply to the fastener receiver 210 of FIG. 14. For example, the fastener receiver 210 of FIG. 14 can be the fastener receiver used in the construction connectors 12 of FIGS. 6-8. In this embodiment, the side wall 220 of the raised element 212 has a truncated cone shape (i.e., a frustum of a cone). The side wall 220 tapers radially inward as the raised element 212 extends distally from the proximal end portion 216 of the raised element to the distal end portion 218 of the raised element.

Figure 15:
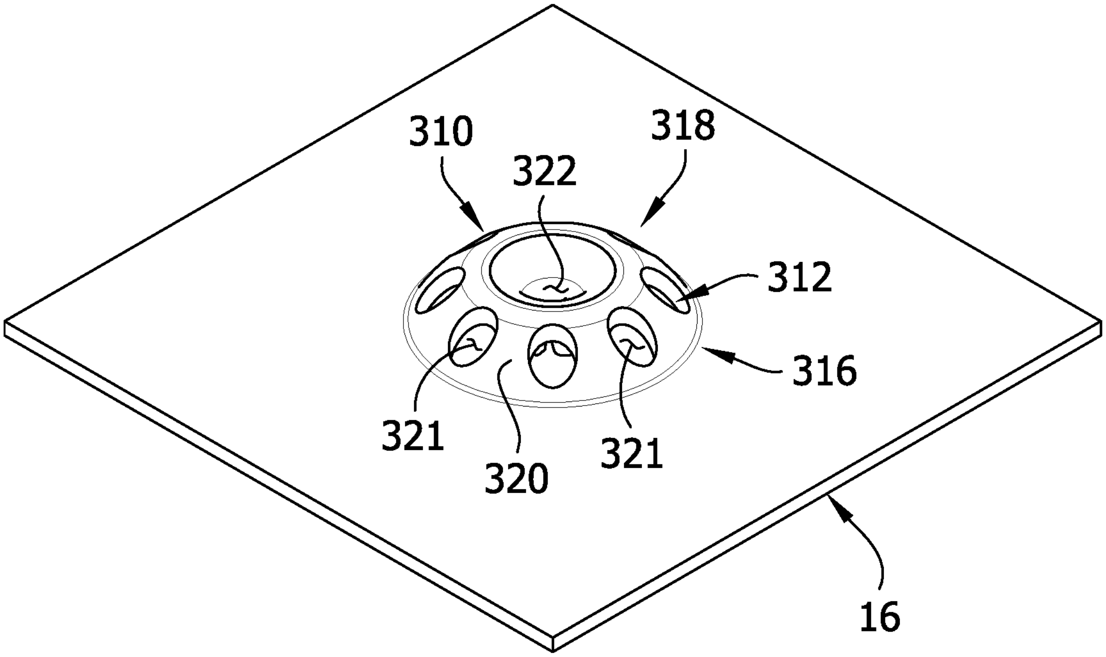
FIG. 15 is a perspective of a fastener receiver of a construction connector element according to another embodiment of the present disclosure.

Referring to FIG. 15, another embodiment of a fastener receiver according to the present disclosure is generally indicated at reference numeral 310. The fastener receiver 310 of FIG. 15 is generally analogous to the fastener receiver 110 of FIGS. 4-13 and, thus, for ease of comprehension, where similar, analogous or identical parts are used, reference numerals "200" units higher are employed. Accordingly, unless clearly stated or indicated otherwise, the above descriptions regarding the fastener receiver 110 of FIGS. 4-13 also apply to the fastener receiver 310 of FIG. 15. For example, the fastener receiver 310 of FIG. 15 can be the fastener receiver used in the construction connectors 12 of FIGS. 6-8. In this embodiment, the raised element 312 includes one or more holes 321. The one or more holes 321 are defined by the side wall 320. In the illustrated embodiment, the raised element 312 includes multiple holes 321 evenly spaced apart circumferentially along the side wall 320. It will be understood that other arrangements of the holes 321 may be employed within the scope of the present invention. The holes 321 have a generally circular shape (as viewed from above). The holes 321 are positioned between the proximal and distal end portions 316, 318 of the raised element 312. The holes 321 weaken the structural integrity of the side wall 320, thereby making it easier to deform the raised element 312 and drive the driving element 314 into the support member 14.

Figure 16:
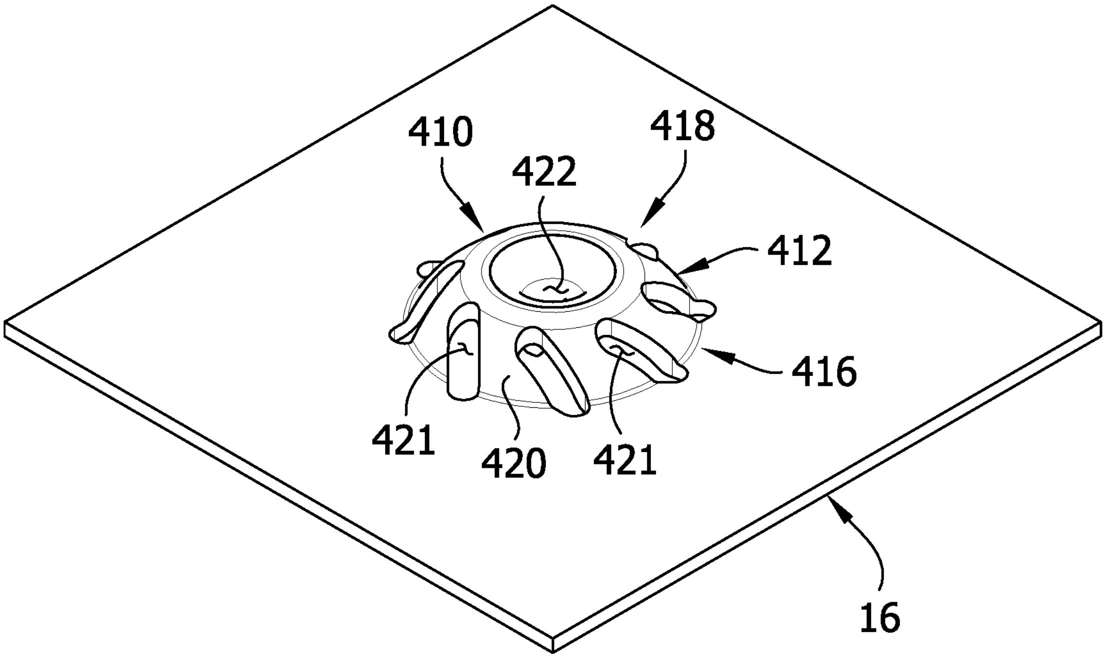
FIG. 16 is a perspective of a fastener receiver of a construction connector element according to yet another embodiment of the present disclosure.

Referring to FIG. 16, another embodiment of a fastener receiver according to the present disclosure is generally indicated at reference numeral 410. The fastener receiver 410 of FIG. 16 is generally analogous to the fastener receiver 110 of FIGS. 4-13 and, thus, for ease of comprehension, where similar, analogous or identical parts are used, reference numerals "300" units higher are employed. Accordingly, unless clearly stated or indicated otherwise, the above descriptions regarding the fastener receiver 110 of FIGS. 4-13 also apply to the fastener receiver 410 of FIG. 16. For example, the fastener receiver 410 of FIG. 16 can be the fastener receiver used in the construction connectors 12 of FIGS. 6-8.

In this embodiment, the raised element 412 includes one or more holes 421. The one or more holes 421 are generally defined by the side wall 420. In the illustrated embodiment, the raised element 412 includes multiple holes 421 evenly spaced apart circumferentially along the side wall 420. It will be understood that other arrangements of the holes 421 may be employed within the scope of the present invention. In this embodiment, each hole 421 comprises an elongate slot. The elongate slots each extend along a segment of a helix (e.g., along a helical path) about the driving element 414. The holes 421 are generally positioned between the proximal and distal end portions 416, 418 of the raised element 412. The holes 421 weaken the structural integrity of the side wall 420, thereby making it easier to deform the raised element 412 and drive the driving element 414 into the support member 14. In the illustrated embodiment, the holes 421 extend slightly into the connection element 16, thereby weakening the connection between the side wall 420 and the connection element (at the bend therebetween) to facilitate the bending at this intersection between the side wall and the connection element as the driving element 414 is driven into the support member 14. This helps ensure the raised element 412 will bend into a generally flat configuration as it is deformed.

Figure 17:
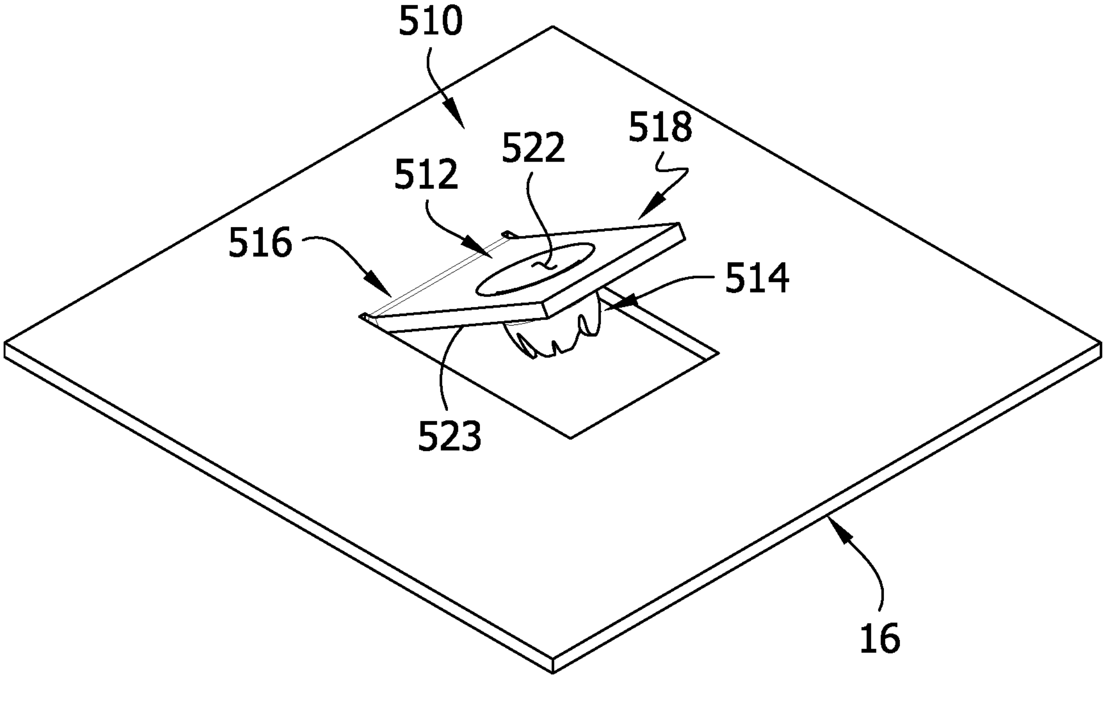
FIG. 17 is a perspective of a fastener receiver of a construction connector element according to a further embodiment of the present disclosure.

Referring to FIG. 17, another embodiment of a fastener receiver according to the present disclosure is generally indicated at reference numeral 510. The fastener receiver 510 of FIG. 17 is generally analogous to the fastener receiver 110 of FIGS. 4-13 and, thus, for ease of comprehension, where similar, analogous or identical parts are used, reference numerals "400" units higher are employed. Accordingly, unless clearly stated or indicated otherwise, the above descriptions regarding the fastener receiver 110 of FIGS. 4-13 also apply to the fastener receiver 510 of FIG. 17. For example, the fastener receiver 510 of FIG. 17 can be the fastener receiver used in the construction connectors 12 of FIGS. 6-8.

In this embodiment, the raised element 512 includes a flange or tab 523 extending from the proximal end portion 516 to the distal end portion 518. The tab 534 is generally planar. The tab 523 has a first or attached end (broadly, the proximal end portion 516) attached to the connection element 16 and an opposite second or free end (broadly, the distal end portion 518). The sides of the tab 523 are also free. The tab 523 extends at an angle to the interface surface 18 of the connection element 16. In this embodiment, as the driving element 514 is driven into the support member 14, the tab 523 generally bends about the connection between the tab and the connection element 16.

Figure 18:
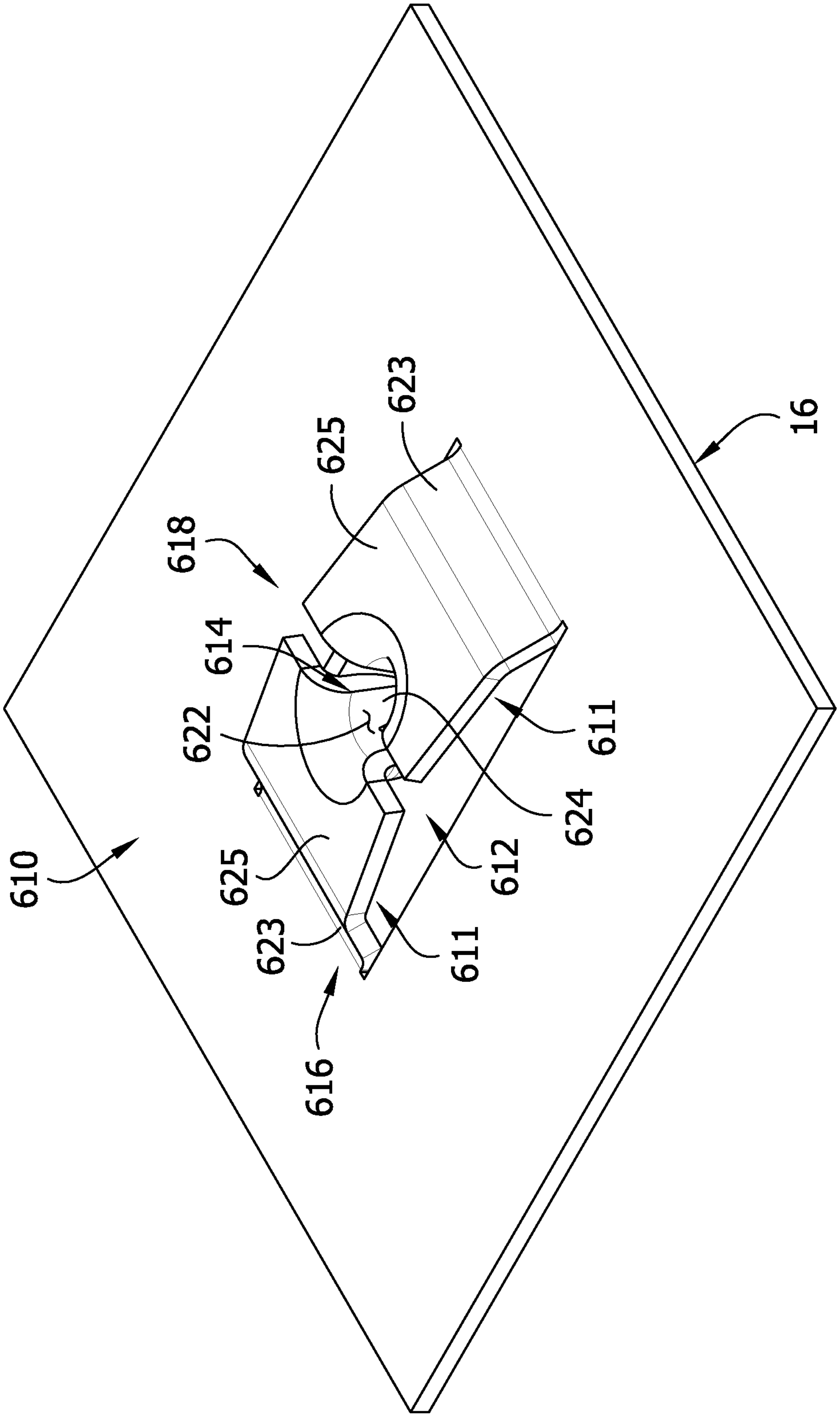
FIG. 18 is a perspective of a fastener receiver of a construction connector element according to still a further embodiment of the present disclosure.

Referring to FIG. 18, another embodiment of a fastener receiver according to the present disclosure is generally indicated at reference numeral 610. The fastener receiver 610 of FIG. 18 is generally analogous to the fastener receiver 110 of FIGS. 4-13 and, thus, for ease of comprehension, where similar, analogous or identical parts are used, reference numerals "500" units higher are employed. Accordingly, unless clearly stated or indicated otherwise, the above descriptions regarding the fastener receiver 110 of FIGS. 4-13 also apply to the fastener receiver 610 of FIG. 18. For example, the fastener receiver 610 of FIG. 18 can be the fastener receiver used in the construction connectors 12 of FIGS. 6-8.

In this embodiment, the fastener receiver 610 comprises first and second fastener receiver portions 611. Together, the first and second fastener receiver portions 611 define the raised element 612 and the driving element 614 of the fastener receiver 610. The first and second fastener receiver portions 611 are generally identical (e.g., mirror images of one another). Each fastener receiver portion 611 includes a first flange or tab 623 and a second flange or tab 625. The first and second tabs 623, 625 of the first and second fastener receiver portions 611 form the raised element 612. Each first tab 623 is connected to the connection element 16 at one end with the corresponding second tab 625 connected to the opposite end. Each second tab 625 extends from the first tab 623 to a generally free end. In this embodiment, each second tab 625 supports a portion of the cylindrical wall 624 of the driving element 614. A portion (e.g., about half) of the cylindrical wall 624 extends downward from each second tab 625 of the first and second fastener receiver portions 611. The first and second fastener receiver portions 611 are spaced apart from each other. Specifically, the free ends of the first and second tabs 623, 625 face one another but are spaced apart. Likewise, each portion of the cylindrical wall 624 defined by the first and second fastener receiver portions 611 is spaced apart but arranged to form the fastener opening 622 therebetween.

In this embodiment, as the driving element 614 is driven into the support member 14, each first tab 623 generally bends about the connection between it and the connection element 16 and each second tab 625 generally bends about the connection between it and its respective connection to the connection element. As a result, the free ends of the first and second receiving portions 611 generally move toward each other as the first and second receiving portions are generally flattened. This enables the two portions of the cylindrical wall 624 of the driving element 614 to move toward each other and generally clamp against the fastener 10 as the fastener and driving element are driven into the support member, thereby providing a secure connection between the fastener and driving element for the transfer of load therebetween. Moreover, the firm engagement of the portions of the cylindrical wall 624 allow the wall to act as a unitary piece to resist loads.

In view of the above, it will be seen that the several features of the disclosure are achieved and other advantageous results obtained.

Having described the disclosure in detail, it will be apparent that modifications and variations are possible without departing from the scope of the disclosure defined in the appended claims.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above products without departing from the scope of the disclosure, it is intended that all matter contained in the above description and shown in the accompanying drawings shall be interpreted as illustrative and not in a limiting sense.

What is claimed is:

1. A method of making a construction connector from a deformable sheet material, the method comprising:

- forming a connection element of the construction connector out of the sheet material; and
- forming a fastener receiver out of a portion of the sheet material, the fastener receiver having a raised element and a driving element, the raised element having a proximal end portion connected to the connection element and a distal end portion disposed distally of the proximal end portion, the driving element being coupled to the distal end portion of the raised element and extending generally proximally from the distal end portion of the raised element, the driving element including a cylindrical wall sized and shaped to receive a fastener and engage a shaft of the fastener, the cylindrical wall configured to be driven into the support member with the shaft of the fastener and to operatively engage the shaft within the support member along a length of the cylindrical wall that is greater than the thickness of the sheet material to transfer loads between the support member and the shaft of the fastener.

2. The method of claim 1, wherein forming the fastener receiver includes piercing the portion of the sheet material forming the fastener receiver without removing any of the sheet material.

3. The method of claim 1, wherein said forming the connection element comprises stamping the connection element out of the sheet material.

4. The method of claim 3, wherein said forming the fastener receiver comprises stamping the fastener receiver out of the portion of the sheet material forming the connection element.

5. The method of claim 1, wherein said forming the fastener receiver comprises stamping the fastener receiver out of the portion of the sheet material forming the connection element.

6. The method of claim 1, wherein said forming the fastener receiver occurs after said forming the connection element.

7. The method of claim 1, further comprising forming an opening in the raised element.

8. The method of claim 7, wherein the opening has a circular shape.

9. The method of claim 1, further comprising forming a plurality of openings in the raised element.

10. The method of claim 9, wherein each opening of the plurality of openings is an elongate slot.

11. The method of claim 10, wherein forming the plurality of openings includes forming the elongate slots to extend along helical paths.

12. The method of claim 1, wherein said forming the fastener receiver comprises deforming the portion of the sheet material forming the connection element in a distal direction to form the raised element.

13. The method of claim 12, wherein said forming the fastener receiver comprises deforming the portion of the sheet material forming the connection element in a proximal direction, opposite the distal direction, to form the driving element.

14. The method of claim 13, wherein said deforming the portion of the sheet material forming the connection element in the proximal direction comprises piercing the portion of the sheet material in the proximal direction.

15. The method of claim 14, wherein said piercing comprises splitting the portion of the sheet material to form a plurality of tips at the proximal end of the driving element.

16. The method of claim 1, wherein the construction connector is a joist hanger.

17. The method of claim 1, wherein the construction connector is an angled bracket.

18. The method of claim 1, wherein the construction connector is a strap.

19. The method of claim 1, wherein the sheet material comprises sheet metal.

20. The method of claim 1, wherein the connection element comprises a plate or a flange.

21. The method of claim 1, wherein the connection element has an interface surface arranged to engage the support member when the construction connector is connected to the support member with the fastener, wherein said positioning the proximal end of the driving element includes positioning the proximal end of the driving element to be co-planar with the interface surface or positioning the proximal end of the driving element to be disposed distally of an interface surface plane defined by the interface surface.

22. The method of claim 1, wherein said forming the fastener receiver includes sizing and positioning the distal end portion of the raised element to be engaged by a head of the fastener as the fastener is driven into the support member to drive the proximal end of the driving element into the support member, wherein the driving element includes at least a portion of the cylindrical wall.

23. A method of connecting a construction connector formed from a deformable sheet material having an inner face and an outer face to a support member, the method comprising:

placing an undeformed portion of the inner face of the sheet material against the support member, the undeformed portion of the inner face surrounding a connection element of the construction connector, the connection element including a raised element and a fastener receiver projecting from the raised element;

inserting a fastener through a fastener opening of the fastener receiver; and driving the fastener into the support member, said driving the fastener including driving the fastener receiver into the support member, such that the fastener receiver moves from a first position to a second position with respect to the sheet material, said step of driving the fastener receiver into the support member occurring after the undeformed portion of the sheet material engages the support member.

24. The method of claim 23 wherein the fastener receiver further includes a raised element, said step of driving the fastener into the support member further including deforming the raised element thereby to drive the driving element into the support member.

25. The method of claim 24 wherein driving the fastener into the support member further comprises engaging the raised element with a head of the fastener for transferring force to the raised element to deform the raised element.

26. The method of claim 23 wherein the driving element includes a cylindrical wall and said step of driving the fastener into the support member comprises driving at least a portion of the cylindrical wall into the support member.

* * * * *